Dec. 20, 1966  K. L. KIRKPATRICK  3,292,950
HITCH POLE
Filed March 25, 1965

INVENTOR.
KENNETH L. KIRKPATRICK
BY
John C. Thompson
ATTORNEY

United States Patent Office 3,292,950
Patented Dec. 20, 1966

3,292,950
HITCH POLE
Kenneth L. Kirkpatrick, Welland, Ontario, Canada, assignor to Deere & Company, Moline, Ill., a corporation of Delaware
Filed Mar. 25, 1965, Ser. No. 442,628
3 Claims. (Cl. 280—482)

The present invention relates generally to coupling devices and more particularly to hitch poles adapted to interconnect a towed vehicle with a propelling vehicle, such as a farm wagon with a farm tractor.

The principal object of the present invention is to provide an improved adjustable hitch pole. More specifically, it is an object of the present invention to provide a hitch pole which can be easily extended for securing the hitch pole with the propelling vehicle, and which can be retracted into a locked position.

Another object of the present invention is to provide a hitch pole which is adjustable in length whereby the towed vehicle may be held at different distances behind a propelling vehicle, such as a corn picker, baler or the like.

Another object of the present invention is to provide novel safety stop means which prevents the hitch pole from becoming separated when not properly locked.

A further object of the present invention is to provide an adjustable hitch pole of simple construction and durable design in which no tools are needed to adjust the locked length or to extend or retract the pole from its locked length.

These and other objects and advantages of this invention will be apparent to those skilled in the art after a consideration of the following detailed description, taken in conjunction with the accompanying drawings, in which the preferred form of this invention is illustrated.

Figure 2:
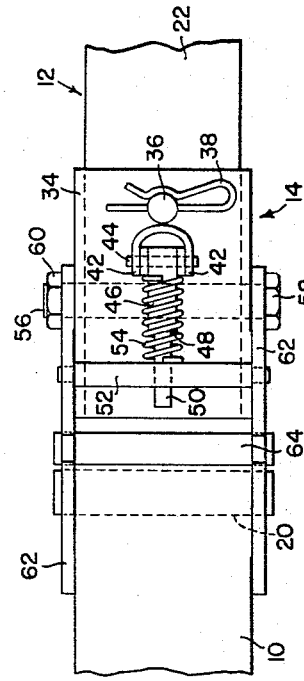
FIG. 2 is an enlarged plan view of the latch collar and spring rod assembly shown in FIG. 1.

The hitch pole assembly of the present invention consists essentially of an outer hitch pole or tube 10, an inner hitch pole or tube 12 and a latch assembly indicated generally at 14. Secured to the rear end of the outer hitch pole or tube are hitch straps 16 or the like which may be secured to the towed vehicle. A transversely disposed safety stop pin 18 is carried by opposed side walls of the hitch pole 10. A transversely extending latch pin 20 is mounted at the forward end of the hitch pole 10 and is similarly held between opposed side walls, the latch pin 20 and stop pin 18 being disposed in the same plane. The opposite end portions of the latch pin 20 extend outwardly of the sides for reasons which will become apparent.

The inner hitch pole is formed from spaced apart upper and lower channel-shaped members 22 and 24 which are provided wtih a plurality of alined apertures 26. A clevis 28 is welded to the forward end of the upper and lower members, and a safety stop 30 is welded to the rear end of the upper and lower members, the clevis and safety stop serving to hold said upper and lower members apart whereby a longitudinally extending slot is formed in between said members. Mounted on the forward end of the clevis is a drawbar pin 32, which may engage the drawbar 33 of the propelling vehicle.

The latch assembly 14 includes a latch collar 34 which is slidably disposed about the inner hitch pole 12. An adjusting pin 36 is disposed within the alined apertures in the latch collar 34 and also through alined apertures 26 in the inner hitch pole to hold the collar in selected positions of adjustment. The adjusting pin 36 is held in place by means of a spring locking pin 38. Rigidly secured to the upper surface of the latch collar 34 is a generally U-shaped anchor member whose opposed legs 42 are apertured to receive a wrist pin 44. Journaled about the wrist pin 44 is a spring rod 46 which is provided with a shoulder portion 48. The reduced end 50 of the spring rod 46 is disposed within an aperture in the spring swivel block 52. A compression spring 54 is disposed over the spring rod 46 and one end abuts the spring swivel block 52 while the other end abuts the U-shaped anchor member 40.

Figure 1:
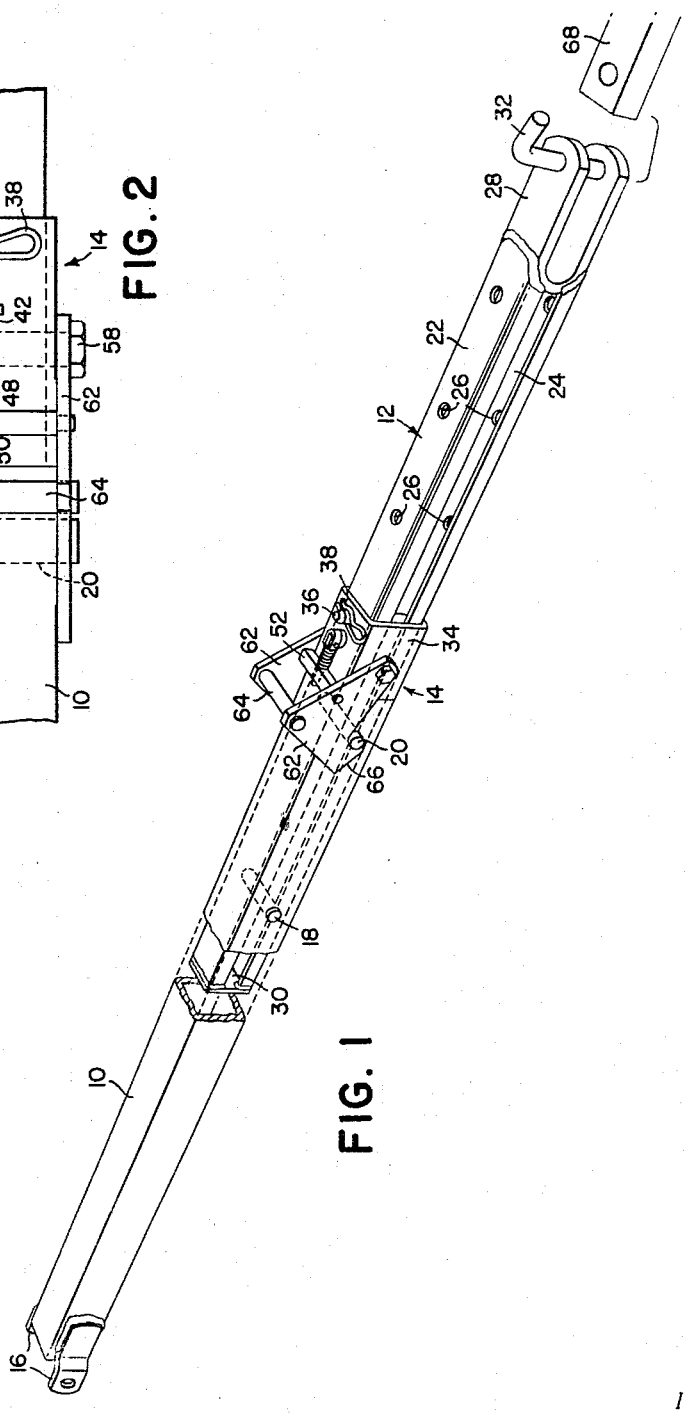
FIG. 1 is a perspective view of the hitch pole of this invention latched in a medium length setting.

A bolt or pivot pin 56 extends through the slot formed between the upper and lower members 22, 24 and is carried by the latch collar 34. The pin pivotally holds one end of the latch plates 62 between the latch collar 34 and the head 58 of the bolt on one side and the nut 60 on the other side. Each latch plate is generally triangular in shape and is apertured at the lower forward apical end portion to receive the bolt 56, each plate also being apertured at the upper central apical point to receive a latch plate handle 64. The lower rear apical portion of each of the latch plates 62 is provided with a cam surface 66. Disposed between the cam surface 66 and the pivot pin 56 is a hook which is shown in FIG. 1 as receiving the outwardly extending portion of the latch pin 20. The latch pin 20 extends through the slot between the upper and lower members 22, 24.

In operation it is only necessary to secure the hitch pole 10 to the towed vehicle by means of hitch straps 16 or the like, to set the latch collar 14 to the desired hitch pole length setting by simply pulling the pin 36 and sliding the latch collar until the apertures within the latch collar are in alinement with the desired apertures in the upper and lower members 22, 24 and then reinserting the adjusting pin 36 and securing it in place by means of the spring locking pin 38. After the desired length has been adjusted, the latch plate handle is lifted up and pulled out to extend the inner hitch pole for alinement with an attachment to the towing vehicle drawbar 68. It is then only necessary to back up the towing vehicle until the latch plate automatically locks over the lock pin. To this end it should be noted that the spring 54 will normally bias the latch plates 62 downwardly, but that during rearward movement of the inner hitch pole 12 the ends of the latch pin 20 will be engaged by the cam surfaces 66 and that the latch will be cammed upwardly until the lowest point of the plates passes over the latch pin 20 at which time the spring 54 forces the hooks down to thereby engage the latch pin. Additional rearward movement of the hitch pole is stopped when the rear end of the latch collar 34 abuts against the forward end of the outer hitch pole 10.

The shoulder 48 on the spring rod 46 will contact the forward side of the spring swivel block at a position which permits the latch plates to clear the latch pin, but prevents further compression and resulting damage to the spring when pulling on the latch plate handle to extend the inner hitch pole.

There is a double safety pin feature provided in applicant's construction that will prevent the pole from coming apart if the latch plates are not securely latched over the latch pins. The regular safety pin 18 will normally be engaged by the safety stop 30 if the pole is not latched and a pulling is exerted through the clevis 28. However, if the pin 18 is removed, or has failed for some reason or other, the latch pin 20 will serve the same safety function.

It may be desirable to adjust the length of the hitch pole during operation, as for example when a baler is the propelling vehicle and a wagon is the towed vehicle, as is shown in U.S. Patents Nos. 3,043,418 and 3,128,870, or when the propelling vehicle is a corn picker and the towed vehicle is again a wagon, as shown in U.S. Patents 2,536,899 and 2,787,877. Thus, it may be desirable to fill the back of the wagon from the baler or corn picker, and then to release the latch to let the hitch extend to that position where the stop 30 is contacted by the stop pin 18 and then fill the front of the towed vehicle. This may be accomplished without leaving the operator's platform of the propelling tractor simply by tying a rope about the latch plate handle 64 and pulling the rope at the desired time.

It should be noted that the above construction is such that no tools are needed to adjust the length of the hitch pole or to extend the hitch pole when securing the hitch pole to the drawbar of a tractor or other propelling vehicle.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

The embodiments of the invention in which an exclusive property or privilege is claimed are defined as follows:

1. An adjustable hitch pole comprising: an inner pole having upper and lower longitudinally extending apertured members, a forwardly extending clevis rigidly secured to the front ends of the spaced apart members, a safety stop rigidly secured to the rear ends of the spaced apart members, the clevis and the safety stop holding the upper and lower members apart to form a longitudinally extending slot between them, an outer pole telescopically disposed about said inner pole, a transversely extending safety stop pin secured to opposite side walls of the outer pole and passing between the upper and lower members, outwardly extending latch pin means mounted on opposite side portions of said outer pole, an apertured latch collar slidably disposed about the inner pole, adjusting pin means disposed within the apertures of the latch collar and corresponding apertures in the inner hitch pole to hold said collar in selected positions of adjustment, outwardly extending pivot pin means mounted on opposed side portions of the latch collar, latch plate means swingably secured at their forward end about the pivot pin means, said latch plate means being provided with an upwardly and rearwardly extending cam surface to the rear of the forward end and hook means disposed between the cam surface and the forward end.

2. The invention set forth in claim 1 in which resiliently yieldable means are provided to normally bias the cam surface of said latch plate means downwardly.

3. The invention set forth in claim 2 in which said resiliently yieldable means includes anchor means mounted on the latch collar, the anchor means having opposed walls, transversely extending wrist pin means extending between said walls, an apertured spring level block mounted on said latch plate means for swiveling, a spring rod carried by the wrist pin means at one end, the other end extending through the aperture in the swivel block, the spring rod having a shoulder portion formed between its ends and adapted to abut said spring swivel block, and compression spring means disposed about said spring rod and reacting between said swivel block and said anchor to hold down the cam surface on the latch plate means.

References Cited by the Examiner
UNITED STATES PATENTS

| | | | |
|---|---|---|---|
| 2,415,479 | 2/1947 | Forney | 280—482 |
| 2,446,223 | 8/1948 | Forney | 280—482 X |
| 2,693,368 | 11/1954 | Petron | 280—482 |
| 3,014,738 | 12/1961 | Kasten | 280—482 |
| 3,116,076 | 12/1963 | Zingsheim | 280—482 |

LEO FRIAGLIA, *Primary Examiner.*